(12) United States Patent
Ichihashi et al.

(10) Patent No.: US 11,770,614 B2
(45) Date of Patent: Sep. 26, 2023

(54) IMAGE PROCESSING DEVICE AND METHOD, AND PROGRAM

(71) Applicant: SONY GROUP CORPORATION, Tokyo (JP)

(72) Inventors: Hideyuki Ichihashi, Tokyo (JP); Kazunori Kamio, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/911,012

(22) PCT Filed: Mar. 18, 2021

(86) PCT No.: PCT/JP2021/010987
§ 371 (c)(1),
(2) Date: Sep. 12, 2022

(87) PCT Pub. No.: WO2021/200191
PCT Pub. Date: Oct. 7, 2021

(65) Prior Publication Data
US 2023/0088836 A1   Mar. 23, 2023

(30) Foreign Application Priority Data

Mar. 31, 2020 (JP) ................................ 2020-062190

(51) Int. Cl.
*H04N 23/68* (2023.01)
*H04N 23/58* (2023.01)
(Continued)

(52) U.S. Cl.
CPC ......... *H04N 23/6845* (2023.01); *H04N 23/58* (2023.01); *H04N 23/62* (2023.01); *H04N 23/6812* (2023.01); *H04N 25/48* (2023.01)

(58) Field of Classification Search
CPC .... H04N 25/48; H04N 23/6845; H04N 23/58; H04N 23/62; H04N 23/6812; H04N 23/683; G06T 5/00
See application file for complete search history.

(56) References Cited

U.S. PATENT DOCUMENTS 6,983,080 B2 *   1/2006   Wenstrand ............. H04N 25/48
                                                              382/284
11,350,022 B2 *  5/2022   Van Der Sijde ....... G01B 11/22
(Continued)

FOREIGN PATENT DOCUMENTS

JP   2007323479 A   * 12/2007
JP   2009-194700 A   8/2009
(Continued)

*Primary Examiner* — Chiawei Chen
(74) *Attorney, Agent, or Firm* — Paratus Law Group, PLLC

(57) ABSTRACT

There is provided an image processing device and method, and a program for enabling improvement in image quality in sensor shift imaging. When performing imaging while shifting the pixel phase of an image sensor having a two-dimensional pixel array, an image processing device adds up, for each pixel phase, a plurality of frames imaged in each pixel phase, and generates an addition frame for each pixel phase. The image processing device then combines the addition frames of the respective pixel phases. The present technology can be applied to a sensor shift imaging system.

15 Claims, 15 Drawing Sheets

(51) Int. Cl.
 *H04N 25/48* (2023.01)
 *H04N 23/62* (2023.01)

(56) References Cited

U.S. PATENT DOCUMENTS

| | | | |
|---|---|---|---|
| 2003/0137585 A1* | 7/2003 | Mahon | H04N 3/1587 |
| | | | 348/262 |
| 2007/0297694 A1* | 12/2007 | Kurata | H04N 23/6811 |
| | | | 382/284 |
| 2016/0014354 A1* | 1/2016 | Fukuda | G06T 5/50 |
| | | | 348/273 |
| 2016/0029000 A1* | 1/2016 | Lenz | G02B 21/367 |
| | | | 348/239 |
| 2018/0249073 A1* | 8/2018 | Kim | H04N 13/257 |
| 2018/0295286 A1* | 10/2018 | Maede | H04N 23/54 |
| 2020/0221019 A1* | 7/2020 | Jang | G06F 3/04815 |

FOREIGN PATENT DOCUMENTS

| | | | | |
|---|---|---|---|---|
| JP | 2016-171511 A | | 9/2016 | |
| JP | 2018182622 A | * | 11/2018 | |
| WO | WO 2012/147523 A1 | | 11/2012 | |
| WO | WO-2015165528 A1 | * | 11/2015 | G06T 3/4069 |
| WO | WO 2017/043097 A1 | | 3/2017 | |
| WO | WO-2021044750 A1 | * | 3/2021 | G06T 7/248 |

\* cited by examiner

FIG. 9

| PROCESS | | NORMAL IMAGING | HIGH-SPEED IMAGING |
|---|---|---|---|
| | | · NORMAL SHUTTER SPEED<br>· 1-FRAME IMAGING | · HIGH SHUTTER SPEED<br>· N-FRAME IMAGING |
| PERFORMANCE | SENSITIVITY | ... | ← MAINTAINING S/N RATIO OF NORMAL IMAGING |
| | RESOLUTION | × BLURRED DUE TO VIBRATION | ○ HARDLY BLURRED DUE TO VIBRATION |

FIG. 11

| POSITIONAL DEVIATION ALLOWABLE RANGE | IMAGE QUALITY (RESOLUTION) | PROCESSING SPEED (CALCULATION/IMAGING) |
|---|---|---|
| SMALL | ○ EXCELLENT | × SLOW |
| INTERMEDIATE | △ | △ |
| LARGE | × MISALIGNED/BLURRED | ○ FAST |

↑ IMAGE QUALITY PRIORITIZED
↓ SPEED PRIORITIZED

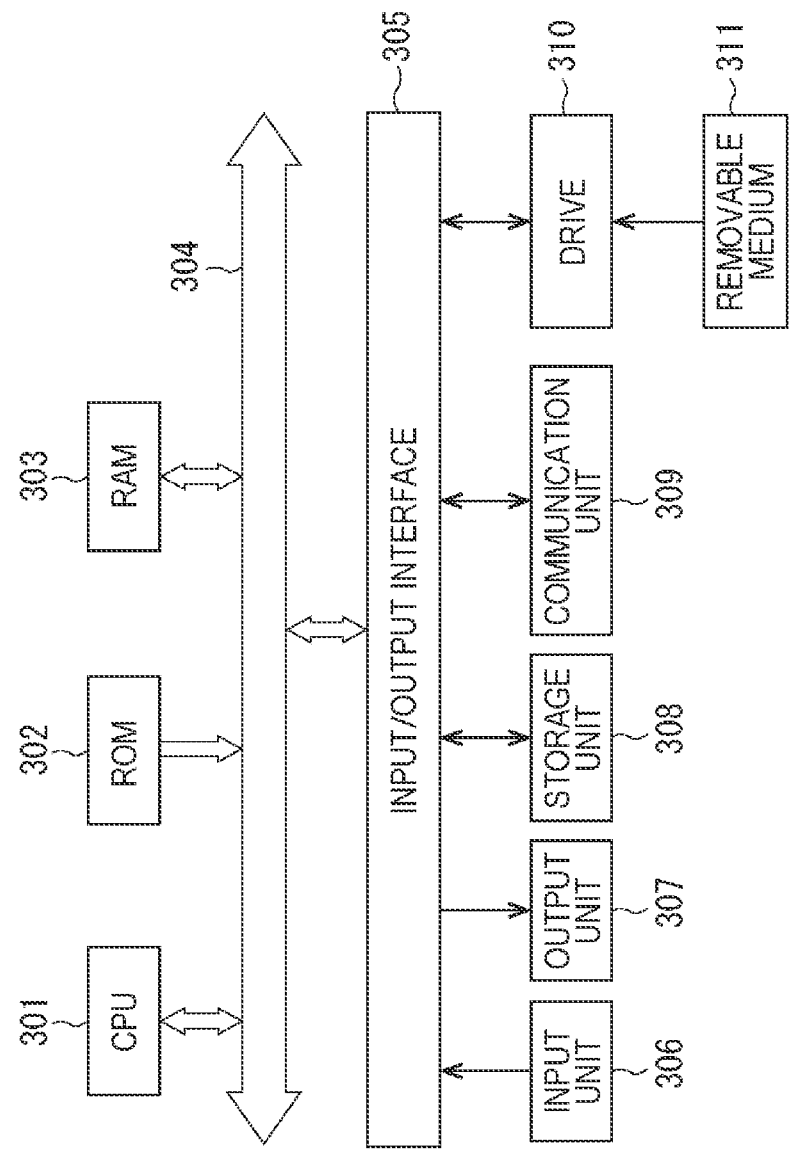

IMAGE PROCESSING DEVICE AND METHOD, AND PROGRAM

CROSS REFERENCE TO PRIOR APPLICATION

This application is a National Stage Patent Application of PCT International Patent Application No. PCT/JP2021/010987 (filed on Mar. 18, 2021) under 35 U.S.C. § 371, which claims priority to Japanese Patent Application No. 2020-062190 (filed on Mar. 31, 2020), which are all hereby incorporated by reference in their entirety.

TECHNICAL FIELD

The present technology relates to image processing devices and methods, and programs, and more particularly, to an image processing device and method, and a program for enabling improvement in image quality in sensor shift imaging.

BACKGROUND ART

Cameras compatible with sensor shift imaging are on the market these days. Sensor shift imaging is an imaging method by which imaging is performed with a camera fixed to a tripod or the like while the image sensor is being shifted, and a plurality of captured images is then combined. By performing sensor shift imaging, even a single-plate sensor can obtain at least the resolution corresponding to that of a three-plate sensor (see Patent Document 1).

CITATION LIST

Patent Document

Patent Document 1: Japanese Patent Application Laid-Open No. 2016-171511

SUMMARY OF THE INVENTION

Problems to be Solved by the Invention

However, in an environment with many disturbances, such as an outdoor environment, the ground is often minutely vibrating, and it is difficult to tightly fix the camera even during imaging with the camera being fixed to a tripod. Therefore, when sensor shift imaging is performed outdoors, a positional deviation between images or image blurring might occur due to vibration of the camera, and image quality might be degraded.

Also, it is difficult for the system to perform optical blur correction during sensor shift imaging. In addition to that, it is difficult to optically correct the minute vibration caused in the camera when sensor shift imaging is performed outdoors. Therefore, in the conventional optical blur correction, it is difficult to appropriately correct the optical blur when sensor shift imaging is performed outdoors.

The present technology has been developed in view of such circumstances, and is to enable improvement in image quality in sensor shift imaging.

Solutions to Problems

An image processing device according to one aspect of the present technology includes: an addition unit that adds up, for each pixel phase, a plurality of frames imaged in each pixel phase, and generates an addition frame for each pixel phase, when performing imaging while shifting the pixel phase of an image sensor having a two-dimensional pixel array; and a combining unit that combines the addition frames of the respective pixel phases.

According to one aspect of the present technology, when imaging is performed while the pixel phase of an image sensor having a two-dimensional pixel array is shifted, a plurality of frames imaged in each pixel phase is added up for each pixel phase, an addition frame is generated for each pixel phase, and the addition frames of the respective pixel phases are combined.

BRIEF DESCRIPTION OF DRAWINGS

FIG. 9 is a table showing the relationship between sensitivity and resolution.

FIG. 11 is a table showing the relationship among the positional deviation allowable range, image quality, and processing speed.

FIG. 15 is a block diagram showing an example configuration of a computer.

MODE FOR CARRYING OUT THE INVENTION

The following is a description of modes for carrying out the present technology. Explanation will be made in the following order.

1. Outline of the present technology
2. System configuration and operation
3. Details of positional deviation determination
4. Other aspects

1. Outline of the Present Technology (Example of the Pixel Array in an Image Sensor)

Figure 1:
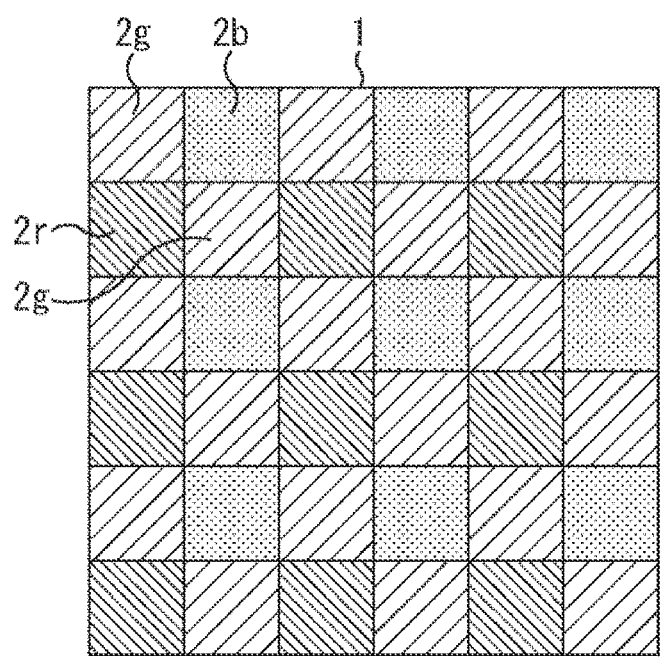
FIG. 1 is a diagram showing an example of the pixel array in an image sensor.

FIG. 1 is a diagram showing an example of the pixel array in an image sensor.

In charge coupled device (CCD) image sensors and complementary metal oxide semiconductor (CMOS) image sensors, a pixel array in which a plurality of pixels that detect blue light, green light, and red light is arranged in a plane with primary color filters is widely used.

For example, an image sensor unit 1 shown in FIG. 1 uses a pixel array (in the case of FIG. 1, the Bayer array) in which a predetermined array pattern including a plurality of pixels 2b, pixels 2g, and pixels 2r that detect blue light, green light, and red light, respectively, is repeated.

That is, in the image sensor unit 1, a plurality of pixels 2 corresponding to the respective colors is arranged so that an array pattern formed with one blue pixel 2b, two green pixels 2g, and one red pixel 2r is repeated.

Also, sensor shift imaging to which the image stabilizer provided in an imaging device is applied has been suggested recently. Sensor shift imaging is an imaging method for generating a high-resolution image by shifting the image sensor unit 1 in a predetermined direction by the amount equivalent to one pixel, acquiring a plurality of image, and combining the plurality of acquired images.

Here, shifting the image sensor unit 1 by the amount equivalent to one pixel at a time means shifting the relative position of the image sensor unit 1 with respect to the object image (or the optical axis of the lens) by the amount equivalent to one pixel at a time.

Further, in the description below, when the array pattern described above form one cycle in the pixel array, a "pixel phase" indicates the position of the image sensor unit 1 shifted with respect to the object image as a position within one cycle in the pixel array. That is, in the present technology, as the image sensor unit 1 is shifted, the "pixel phase" with respect to the object image is shifted, and imaging is then performed.

Note that, by shifting the lens or the imaging device with respect to the object image, instead of shifting the image sensor unit 1, it is also possible to shift the "pixel phase" with respect to the object image and perform imaging in a manner similar to the above. Therefore, the present technology is not limited to cases where the image sensor unit is shifted to shift the pixel phase, but is also applied in cases where the lens or the imaging device is shifted so that the "pixel phase" is shifted accordingly.

(Principles of Sensor Shift Imaging)

Figure 2:
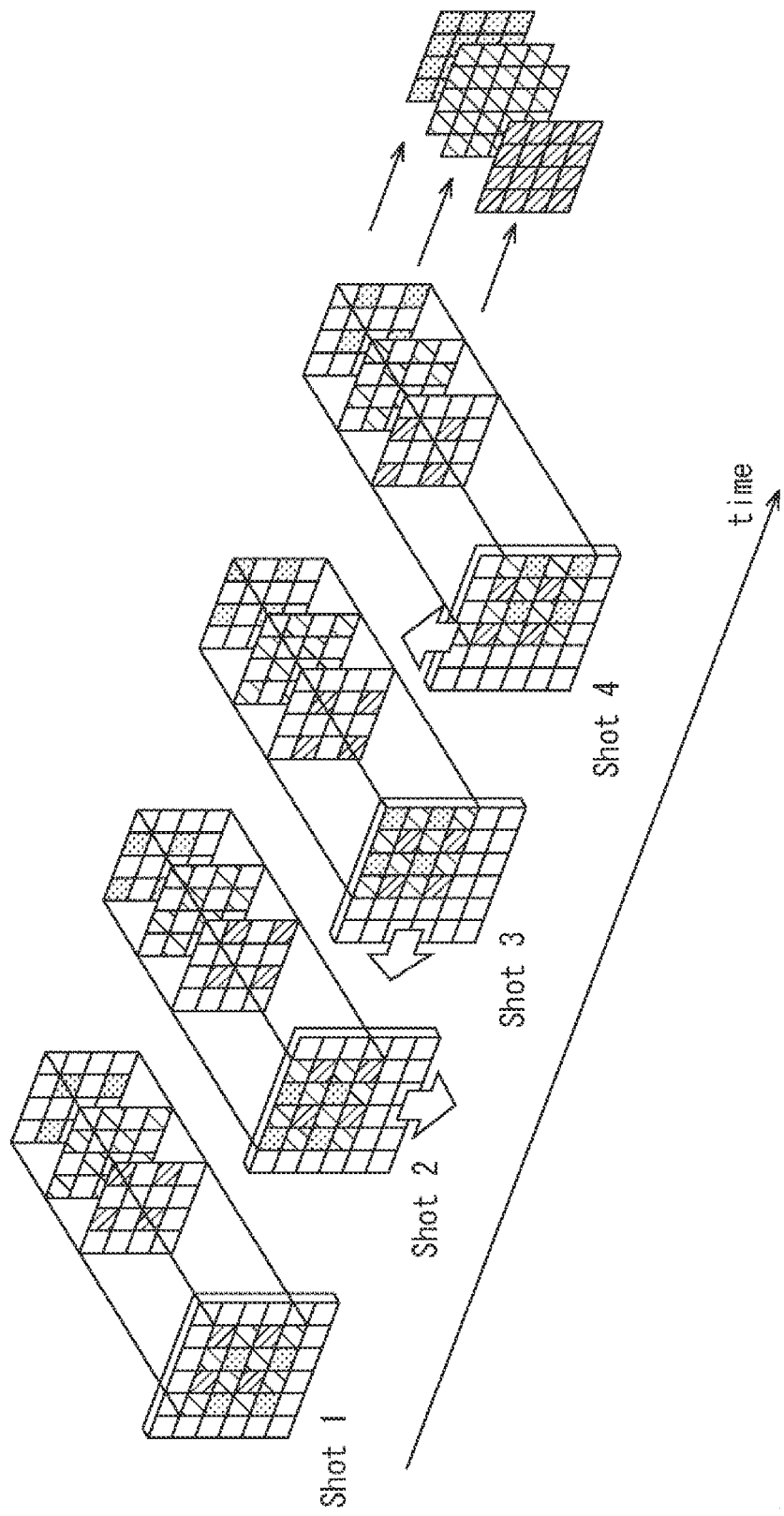
FIG. 2 is a diagram illustrating the principles of sensor shift imaging.

FIG. 2 is a diagram illustrating the principles of sensor shift imaging.

In sensor shift imaging, the imaging device is fixed to a tripod or the like, and the image sensor unit 1 is shifted by the amount equivalent to one pixel in the order of shot 1 to shot 4, and, as shown in FIG. 2, images are continuously captured and combined (as illustrated on the front side in FIG. 2). As a result, blue, green, and red light information can be acquired regarding all the valid pixels 2 (as illustrated at the right end in FIG. 2).

In other words, because of the sensor shift imaging, any of the information about the light of each color is not missing in all the valid pixels 2 in the image sensor unit 1. Accordingly, by the sensor shift imaging, it is possible to generate the high-resolution image by directly combining the information about the light of the respective colors, without performing an interpolation process of interpolating information about light of colors having some missing parts with the information about the surrounding pixels 2. As a result, by the sensor shift imaging, the interpolation process is not performed. Thus, the occurrence of color moire (false color) is minimized, and a higher-definition and faithful texture depiction can be achieved.

(Example of Conventional Sensor Shift Imaging)

Figure 3:
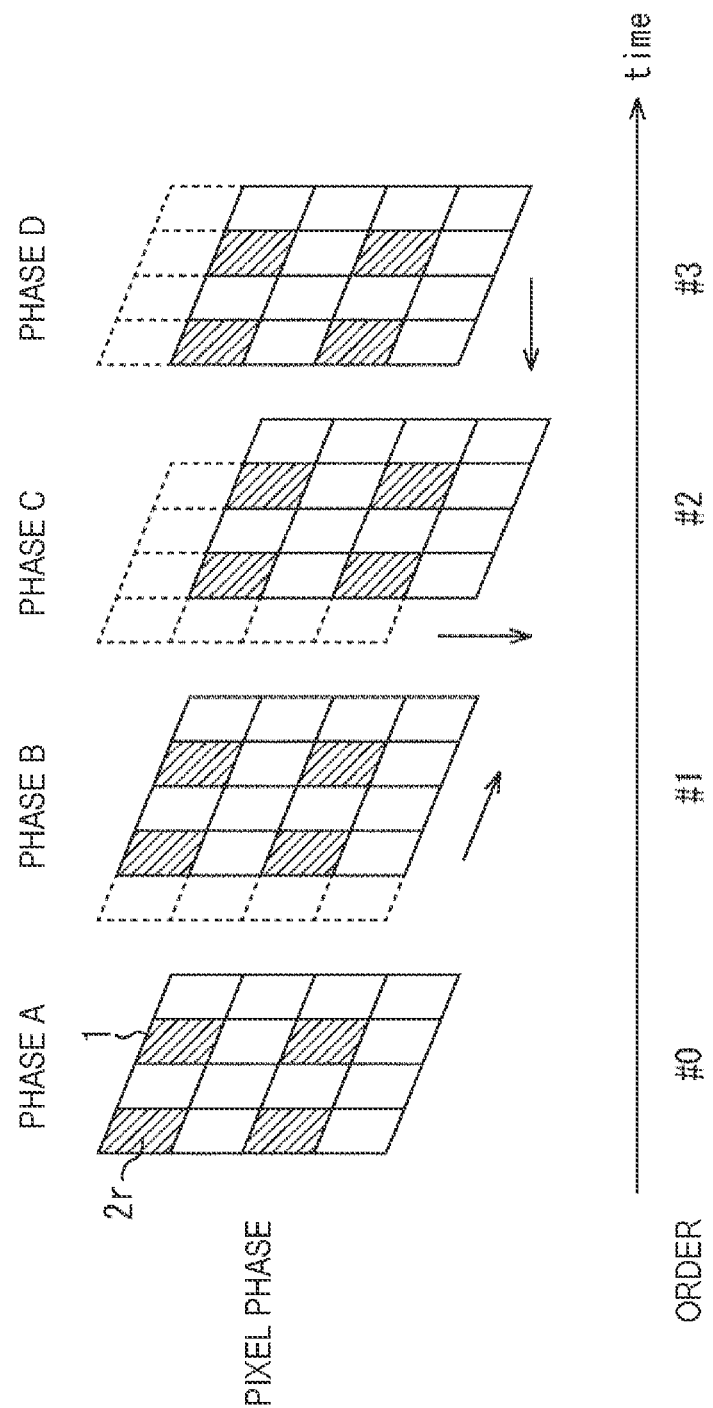
FIG. 3 is a diagram illustrating an example of conventional sensor shift imaging.

FIG. 3 is a diagram illustrating an example of conventional sensor shift imaging.

In FIG. 3, the numbers #0, #1, #2, and #3 allocated to frames of respective pixel phases indicate the imaging order.

Also, in FIG. 3, an arrow indicates a sensor shift direction which is a shift direction of the image sensor unit 1.

Further, in FIG. 3, the positions of pixels 2r of the image sensor unit 1 are indicated by hatching.

As for the imaging order, frame #0 is first imaged by one-time exposure (shutter releasing) at a normal shutter speed in a state where the image sensor unit 1 is in phase A. The normal shutter speed is a shutter speed at which an appropriate exposure amount is obtained by one-time exposure, and hereinafter, capturing an image by one-time exposure at the normal shutter speed will be referred to as normal imaging. Frame #1 is imaged at the normal shutter speed in phase B in which the image sensor unit 1 has been shifted rightward from phase A by the amount equivalent to one pixel.

Frame #2 is imaged at the normal shutter speed in phase C in which the image sensor unit 1 has been shifted downward from phase B by the amount equivalent to one pixel. Further, frame #3 is imaged at the normal shutter speed in phase D in which the image sensor unit 1 has been shifted leftward from phase C by the amount equivalent to one pixel.

Note that the image sensor unit 1 is shifted upward from the state of phase D by the amount equivalent to one pixel, so that the image sensor unit 1 returns to the state of phase A.

After that, sensor shift combining is performed to combine the frames of all the pixel phases, and one frame is generated.

However, in an environment with many disturbances, such as an outdoor environment, the ground often minutely vibrates, and it is difficult to tightly fix the imaging device even during imaging with a fixed tripod. Therefore, when sensor shift imaging is performed outdoors, a positional deviation between images or image blurring might occur due to vibration of the imaging device, and image quality might be degraded.

To counter this, in the present technology, a plurality of frames imaged in each pixel phase is added up in each pixel phase, a frame formed by adding up frames is generated in each pixel phase (this frame will be hereinafter referred to as the addition frame), and the addition frames of the respective pixel phases are combined.

(Example of Sensor Shift Imaging According to the Present Technology)

Figure 4:
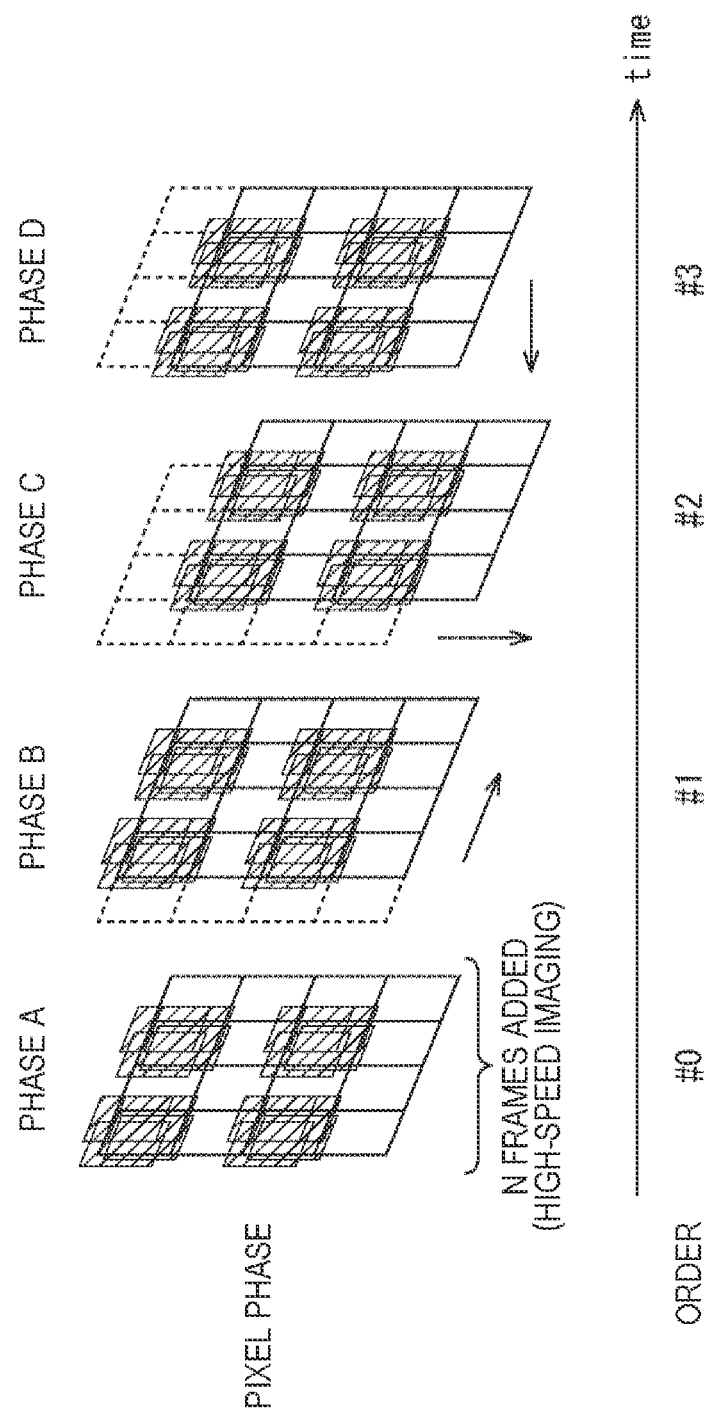
FIG. 4 is a diagram illustrating an example of sensor shift imaging according to the present technology.

FIG. 4 is a diagram illustrating an example of sensor shift imaging according to the present technology.

In FIG. 4, portions corresponding to those in FIG. 3 are denoted by the same reference numerals as those in FIG. 3, and explanation of them is not made herein.

As for the imaging order, frame #0 is generated by adding up the N frames acquired by high-speed imaging at a high shutter speed in a state where the image sensor unit 1 is in phase A. The high shutter speed is the speed obtained by setting the above-described normal shutter speed to 1/N, for example. The frames imaged at this high shutter speed are underexposed.

Frame #1 is generated by adding up the N frames acquired by high-speed imaging at a high shutter speed in a state where the image sensor unit 1 is in phase B.

Frame #2 is generated by adding up the N frames acquired by high-speed imaging at a high shutter speed in a state where the image sensor unit 1 is in phase C. Further, frame #3 is generated by adding up the N frames acquired by high-speed imaging at a high shutter speed in a state where the image sensor unit 1 is in phase D.

After that, sensor shift combining is performed to combine the frames of all the pixel phases, and one frame (hereinafter referred to as the combined frame) is generated.

Outline of a Process Flow According to the Present Technology

Figure 5:
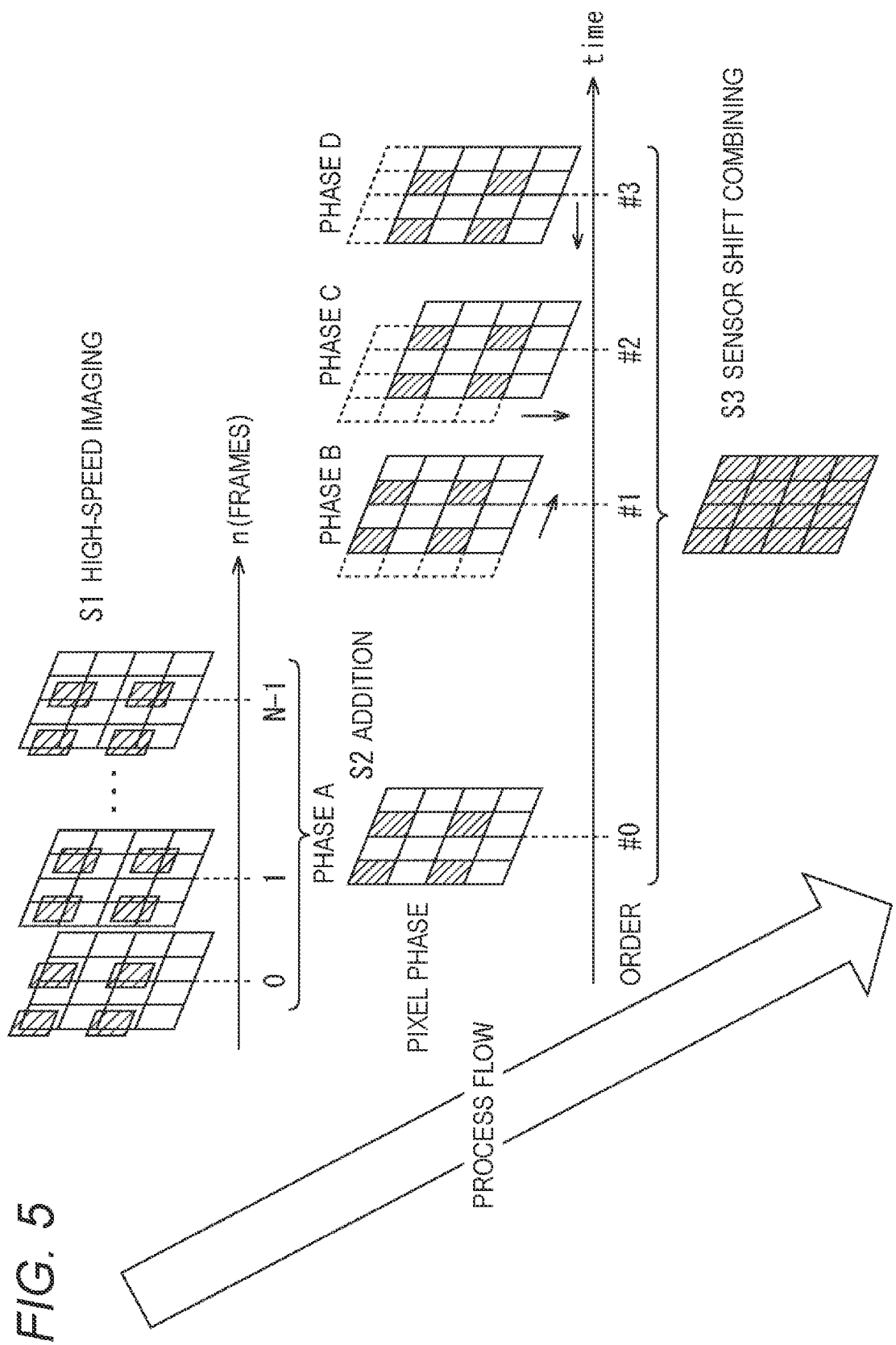
FIG. 5 is a diagram showing an outline of a process flow according to the present technology.

FIG. 5 is a diagram showing an outline of a process flow according to the present technology.

In FIG. 5, a large arrow on the left side indicates an overall process flow. Also, portions corresponding to those in FIG. 3 are denoted by the same reference numerals as those in FIG. 3, and explanation of them is not made herein.

In step S1, high-speed imaging at a high shutter speed is performed with the image sensor unit 1 in phase A, and N frames are acquired.

In step S2, the N frames acquired in phase A are added up, and frame #0 of phase A is generated.

The processes in steps S1 and S2 are performed in a manner similar to the above in phases B to D, so that frame #1 of phase B, so that frame #2 of phase C, and frame #3 of phase D are generated.

In step S3, frame #0 of phase A, frame #1 of phase B, frame #2 of phase C, and frame #3 of phase D are used to perform sensor shift combining, and one frame is generated. After that, the process comes to an end.

Here, in step S1 in FIG. 5, the frames acquired by high-speed imaging in an environment with minute vibration includes a frame at a position close to the set target phase (the target pixel position) and a frame at a position far from the target phase. Therefore, in the present technology, only frames at positions close to the target phase among the frames acquired by high-speed imaging are selected and combined.

In this manner, the occurrence of a positional deviation between images or image blurring due to vibration of the imaging device is reduced, and image quality can be improved.

2. System Configuration and Operation (Example Configuration of a Sensor Shift Imaging System)

Figure 6:
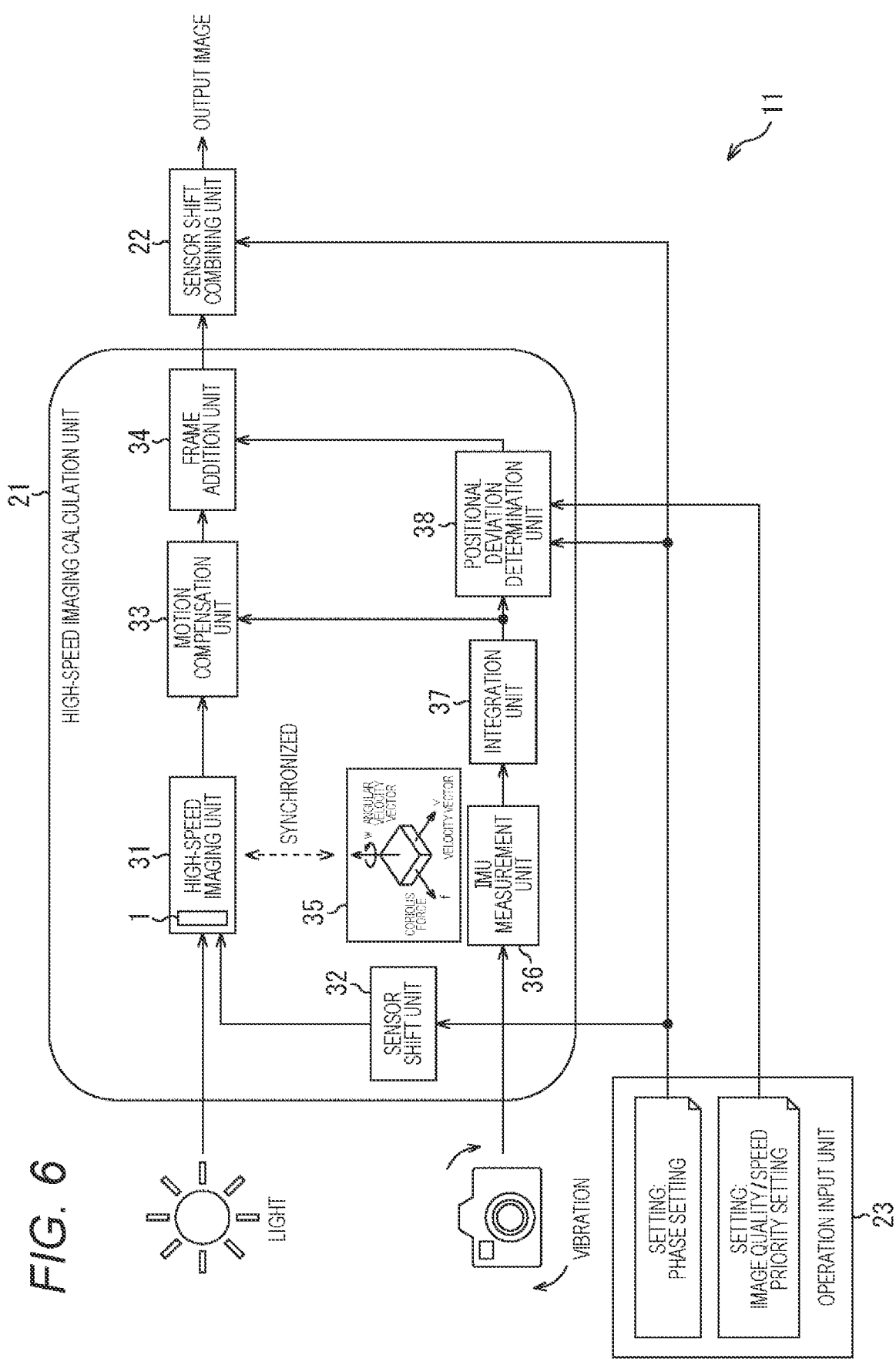
FIG. 6 is a block diagram showing the configuration of an embodiment of a sensor shift imaging system to which the present technology is applied.

FIG. 6 is a block diagram showing the configuration of an embodiment of a sensor shift imaging system to which the present technology is applied.

A sensor shift imaging system 11 in FIG. 6 is formed with an imaging device for a single-lens reflex camera, for example.

In FIG. 6, the sensor shift imaging system 11 includes a high-speed imaging calculation unit 21, a sensor shift combining unit 22, and an operation input unit 23.

The high-speed imaging calculation unit 21 adds up the N frames acquired by performing high-speed imaging at a high shutter speed in each pixel phase, on the basis of each piece of setting information supplied from the operation input unit 23. The high-speed imaging calculation unit 21 outputs, to the sensor shift combining unit 22, the addition frame corresponding to all the pixel phases that have been added up.

The high-speed imaging calculation unit 21 includes a high-speed imaging unit 31 including the image sensor unit 1, a sensor shift unit 32, a motion compensation unit 33, a frame addition unit 34, an inertial measurement unit (IMU) measurement unit 36 including a gyroscope sensor 35, an integration unit 37, and a positional deviation determination unit 38.

The sensor shift combining unit 22 performs sensor shift combining on the frames corresponding to all pixel phases supplied from the high-speed imaging calculation unit 21, and outputs a combined frame to the stage that follows.

The operation input unit 23 includes buttons, a dial, a mouse, a touch panel, and the like. In response to the user's operation, the operation input unit 23 outputs a phase setting that indicates the target phase (the target pixel position) of each pixel phase to the sensor shift unit 32, the positional deviation determination unit 38, and the sensor shift combining unit 22.

Also, in response to the user's operation, the operation input unit 23 outputs an image quality/speed priority setting that indicates whether priority is given to image quality or whether priority is given to the processing speed for acquiring N frames, to the positional deviation determination unit 38. Note that a threshold for positional deviation determination may be directly input.

The high-speed imaging unit 31 includes an optical system such as a lens or a diaphragm that condenses light, the image sensor unit 1, an A/D conversion unit, and the like. The high-speed imaging unit 31 performs high-speed imaging in each pixel phase corresponding to the relative position shifted by the sensor shift unit 32, at a shutter speed (a high shutter speed) of 1/N of the normal shutter speed of appropriate exposure. This high-speed imaging is performed until N frames are acquired in each pixel phase.

For each pixel phase, the high-speed imaging unit 31 outputs the acquired N frames to the motion compensation unit 33.

The sensor shift unit 32 shifts the relative position of the image sensor unit 1 with respect to the object image, on the basis of the phase setting input via the operation input unit 23.

In accordance with the result of positional deviation determination performed by the positional deviation determination unit 38 on the basis of angle information supplied from the integration unit 37, the motion compensation unit 33 performs motion compensation on only the frames to be added up (these frames will be hereinafter referred to as valid frames) as necessary, and outputs the result to the frame addition unit 34. The angle information is acquired and supplied as a result of integration of angular velocities by the integration unit 37.

The frame addition unit 34 adds up only the N valid frames for each pixel phase, in accordance with the positional deviation determination result supplied from the positional deviation determination unit 38. The frame addition unit 34 outputs the addition frames each obtained by adding up N valid frames for all the pixel phases, to the sensor shift combining unit 22.

The IMU measurement unit 36 is formed with sensors such as the gyroscope sensor 35 and an accelerometer. The gyroscope sensor 35 is synchronized with the high-speed imaging unit 31. The IMU measurement unit 36 outputs the angular velocity of the sensor shift imaging system 11 measured by the gyroscope sensor 35, to the integration unit 37.

The integration unit 37 integrates angular velocities, and outputs the angle information acquired as a result of the integration to the motion compensation unit 33 and the positional deviation determination unit 38.

With the phase setting (the target phase) input via the operation input unit 23 being a reference value, the positional deviation determination unit 38 determines a positional deviation of the frames imaged at the high speed, on the basis of the angle information supplied from the integration unit 37. The positional deviation determination unit 38 outputs the result of the positional deviation determination to the frame addition unit 34.

Also, the positional deviation determination unit 38 sets a threshold for positional deviation determination, on the basis of the image quality/speed priority setting supplied from the operation input unit 23 or the angle information supplied from the integration unit 37. The positional deviation determination unit 38 determines a positional deviation of the frames imaged at the high speed, on the basis of the set threshold.

Note that FIG. 6 illustrates an example in which the sensor shift imaging system 11 includes the motion compensation unit 33, but the motion compensation unit 33 is not necessarily included in the sensor shift imaging system 11.

(Operation of the Sensor Shift Imaging System)

Figure 7:
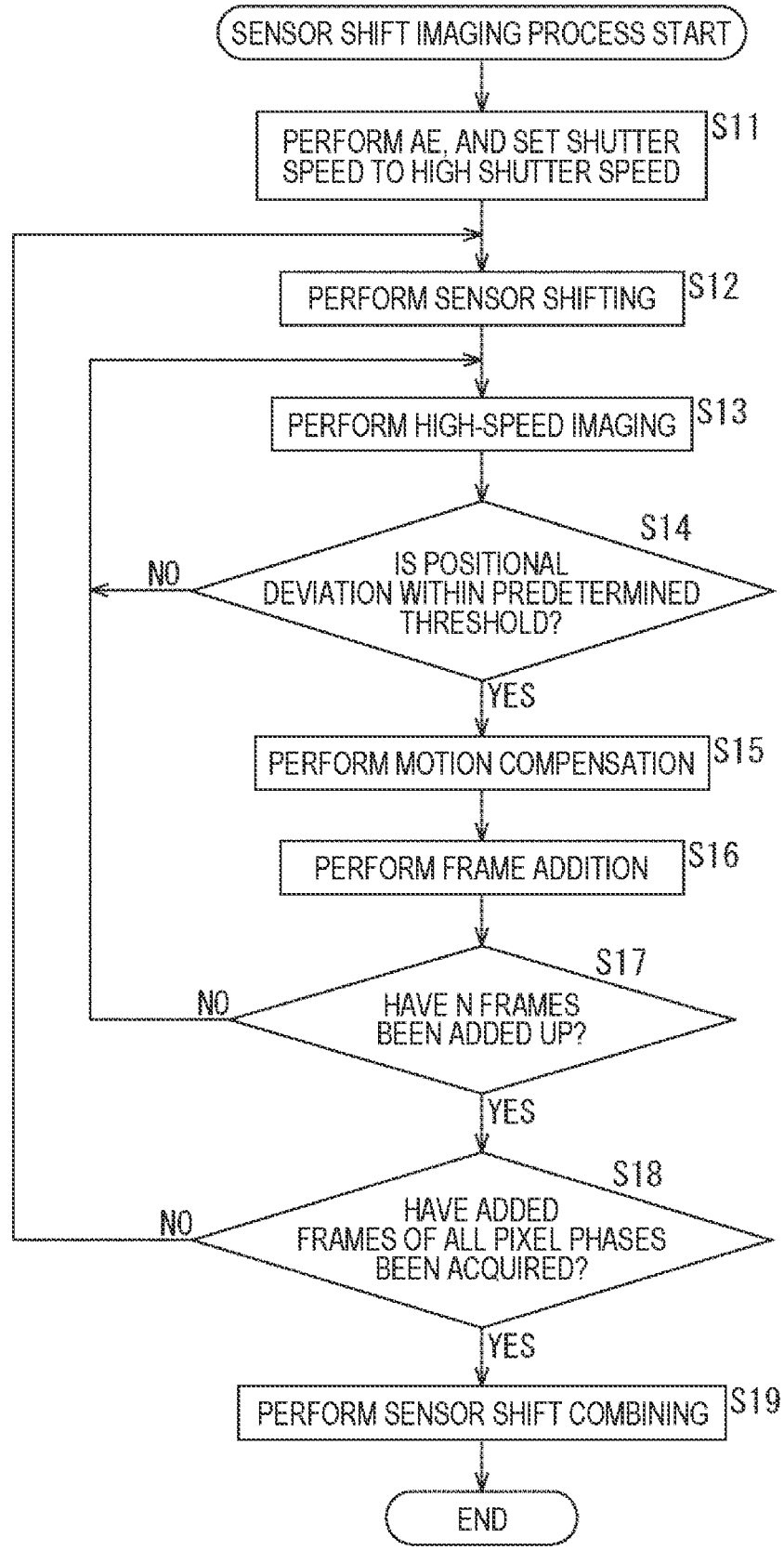
FIG. 7 is a flowchart for explaining a sensor shift imaging process.

Referring now to FIG. 7, a sensor shift imaging process to be performed by the sensor shift imaging system 11 is described.

In step S11, the high-speed imaging unit 31 performs auto-exposure (AE), and calculates the diaphragm and the normal shutter speed with and at which an appropriate exposure is achieved in normal imaging performed by one-time shutter releasing. The high-speed imaging unit 31 sets the shutter speed to a speed (a high shutter speed) that is 1/N of the calculated normal shutter speed.

In step S12, the sensor shift imaging system 11 performs sensor shifting. Specifically, the sensor shift unit 32 shifts the pixel phase of the image sensor unit 1 to the target phase (phase A in FIG. 5, for example), on the basis of the phase setting input via the operation input unit 23.

In step S13, the high-speed imaging unit 31 performs high-speed imaging. Specifically, the high-speed imaging unit 31 performs high-speed imaging in the pixel phase set in step S12 at the high shutter speed set in step S11, to acquire one frame.

In step S14, on the basis of the angle information supplied from the integration unit 37, the positional deviation determination unit 38 determines whether or not the positional deviation of the frame on which high-speed imaging has been performed is within a predetermined threshold.

If it is determined in step S14 that the positional deviation of the frame on which high-speed imaging has been performed is not within the predetermined threshold, the process returns to step S13. The frame determined to have a positional deviation beyond the predetermined threshold (this frame will be hereinafter referred to as an invalid frame) is discarded without being added.

After that, the processes in steps S13 and S14 are repeatedly performed until it is determined in step S14 that the positional deviation of the frame on which high-speed imaging has been performed is within the predetermined threshold.

On the other hand, if it is determined in step S14 that the positional deviation of the frame on which high-speed imaging has been performed is within the predetermined threshold, the process moves on to step S15.

In step S15, on the basis of the angle information supplied from the integration unit 37, the motion compensation unit 33 performs motion compensation as necessary on the valid frame determined to have a positional deviation within the predetermined threshold, and outputs the resultant frame to the frame addition unit 34.

In step S16, the frame addition unit 34 performs frame addition. That is, the frame addition unit 34 adds the newly obtained valid frame to the addition frame obtained by adding up the valid frames so far in the current pixel phase.

In step S17, the frame addition unit 34 determines whether or not N frames have been added up. Further, if it is determined in step S17 that N frames have not been added up, the process returns to step S13.

After that, the processes in steps S13 to S17 are repeatedly performed, until it is determined in step S17 that N frames have been added up.

If it is determined in step S17 that N frames have been added up, on the other hand, the process moves on to step S18. At this point of time, the frame addition unit 34 outputs the addition frame generated by adding up N valid frames, to the sensor shift combining unit 22.

Note that, when it takes a longer time than expected until the number of valid frames reaches N, the process may move on to step S18 before the number of valid frames reaches N.

In step S18, the sensor shift combining unit 22 determines whether or not the addition frames of all the pixel phases have been acquired. If it is determined in step S18 that the addition frames of all the pixel phases have not been acquired, the process returns to step S12.

After that, the processes in steps S12 to S18 are repeatedly performed, until it is determined in step S18 that the addition frames of all the pixel phases have been acquired. As a result, the pixel phase of the image sensor unit 1 is sequentially shifted from phase A to phase D, and the addition frames each obtained by adding up N frames are obtained in all the pixel phases.

If the sensor shift combining unit 22 in step S18 has acquired, from the frame addition unit 34, the addition frames each obtained by adding up N valid frames in all the pixel phases, the sensor shift combining unit 22 determines that the addition frames of all the pixel phases have been acquired, and the process moves on to step S19.

In step S19, the sensor shift combining unit 22 performs sensor shift combining on the addition frames of the respective pixel phases, and outputs a combined frame subjected to the sensor shift combining, to the stage that follows.

As described above, the occurrence of a positional deviation between frames and image blurring due to vibration of the sensor shift imaging system 11 is reduced, and image quality can be improved in sensor shift imaging.

3. Details of Positional Deviation Determination

In the description below, three points of the present technology are explained in order.

a. Compatibility between sensitivity and resolution b. User setting regarding positional deviation determination c. Dynamic control on the threshold, depending on vibration of the imaging device <A. Compatibility Between Sensitivity and Resolution>

Figure 8:
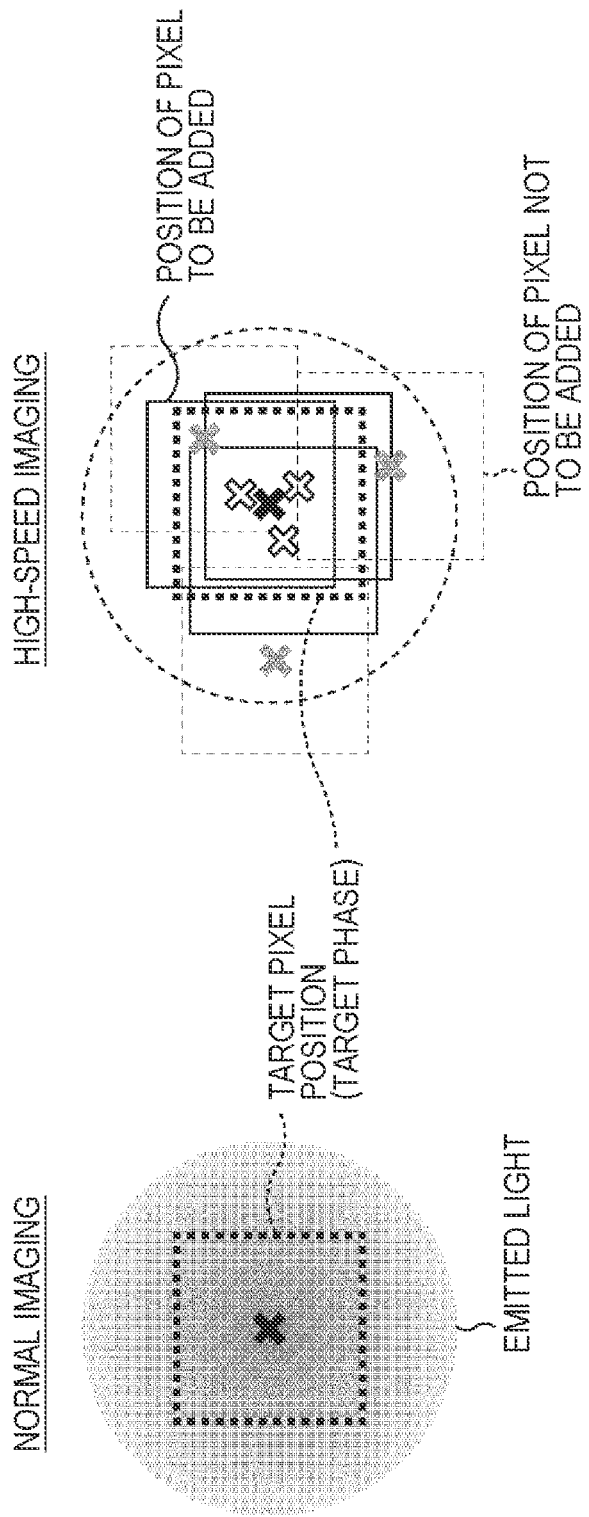
FIG. 8 is a diagram showing pixels acquired in normal imaging and high-speed imaging.

FIG. 8 is a diagram showing images acquired by normal imaging and high-speed imaging. A rectangle drawn with a bold dashed line indicates the target pixel position (the target phase described above), and a cross mark drawn with bold lines indicates the center of the pixel.

The left side in FIG. 8 illustrates a state of light emitted onto the pixel in conventional normal imaging.

In the conventional case, due to vibration of the image sensor unit 1 during exposure, light in the range indicated by the circle with the unclear boundary is emitted onto the pixel, and an image is captured as if the image were blurred.

The right side in FIG. 8 illustrates the distribution of pixel positions (exposed pixel positions) at which frame imaging has been performed in high-speed imaging according to the present technology. As in the drawing on the left side in FIG. 8, a circle drawn with a dashed line indicates the range of light emitted onto the pixel in conventional normal imaging. A rectangle drawn with a solid line indicate the position of a pixel to be added among the positions of pixels on which frame imaging has been performed, and a rectangle drawn with a dashed line indicates the position of a pixel not to be added among the positions of pixels on which frame imaging has been performed.

In the case of the present technology, on the basis of the angle information supplied from the integration unit 37, only the pixel signals obtained at pixel positions close to the target phase are set as the signals to be added among the positions of pixels on which frame imaging has been performed by high-speed imaging. The pixel signals obtained at the other pixel positions are not to be added.

FIG. 9 is a diagram showing a table summarizing the processes and the performance in normal imaging and high-speed imaging.

In FIG. 9, the performance includes sensitivity and resolution.

In the case of the conventional normal imaging, the process includes imaging of one frame at the normal shutter speed as described above. Therefore, although the sensitivity does not change, the image is blurred due to vibration, and the resolution drops.

On the other hand, the process in the case of high-speed imaging according to the present technology includes imaging of N frames at a high shutter speed. In the high-speed imaging, imaging is performed at a high shutter speed that is 1/N of the normal shutter speed at which appropriate exposure is performed in the normal imaging, and therefore, frames (images) that are underexposed (dark or noisy) are acquired.

After that, high-speed imaging and addition of frames are continued until the number of frames reaches N when the same sensitivity (S/N ratio) as that of the normal imaging is achieved. Accordingly, a sensitivity (S/N ratio) similar to that of the normal imaging is maintained. Further, only the valid frames imaged at the pixel positions close to the target phase are added up. Thus, even if vibration occurs, the images are hardly blurred, and a decrease in resolution is prevented.

As described above, according to the present technology, some of the frames imaged at a high speed are selected, and some are discarded. Thus, both sensitivity and resolution can be increased, and image quality is improved.

<b. User Setting Regarding Positional Deviation Determination>

Figure 10:
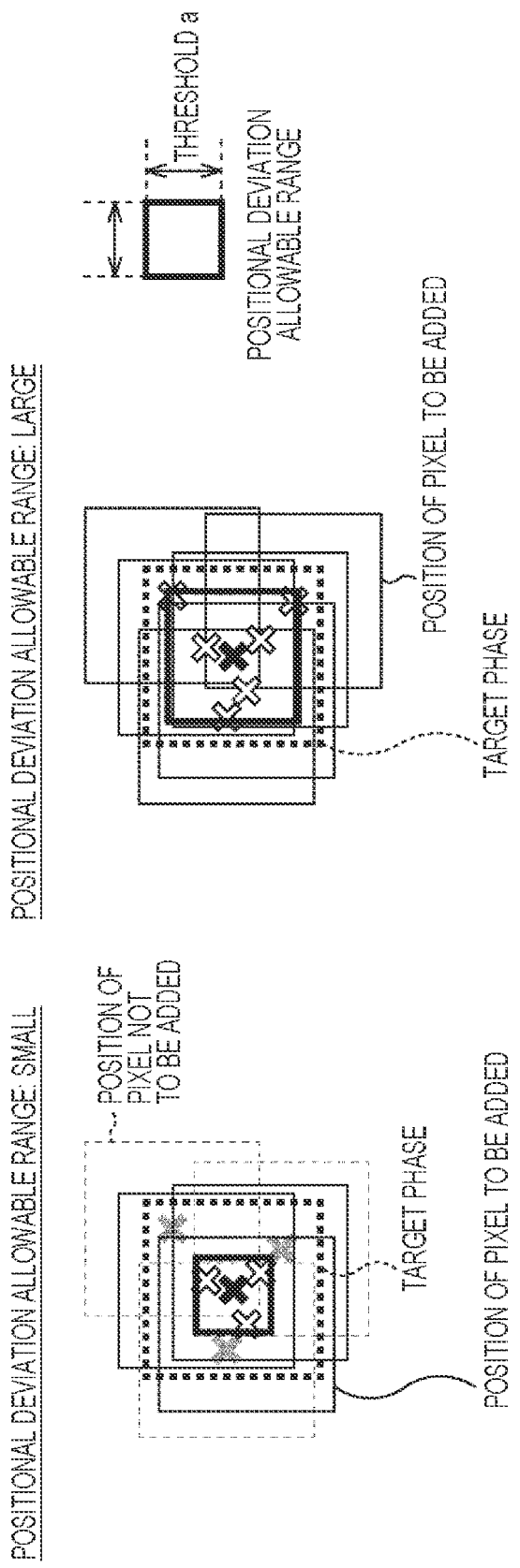
FIG. 10 is a diagram illustrating the size of a positional deviation allowable range.

FIG. 10 is a diagram illustrating the size of a positional deviation allowable range.

In FIG. 10, the portions corresponding to those in FIG. 8 are indicated in the same manner as in FIG. 8. In FIG. 10, a rectangle drawn with a bold line indicates a positional deviation allowable range. The length of a side of a rectangle drawn with a bold line is a threshold a in positional deviation determination.

The left side in FIG. 10 shows an example of a distribution of the positions of pixels to be added and a distribution of the position of pixels not to be added when the positional deviation allowable range is small. The right side in FIG. 10 shows an example of a distribution of the positions of pixels to be added and a distribution of the position of pixels not to be added when the positional deviation allowable range is large.

In either case, among the pixel positions at the time of frame imaging, only the pixel signals obtained at the pixel positions whose centers are within the positional deviation allowable range are set as the addition targets, and only the pixel signals obtained at the pixel positions whose centers are outside the positional deviation allowable range are excluded from the addition targets.

Therefore, when the positional deviation allowable range is small, the resolution is higher, but it takes time to acquire N valid frames.

When the positional deviation allowable range is large, on the other hand, the resolution is lower, but the time required for acquiring N valid frames is shorter.

FIG. 11 is a table showing the relationship among the positional deviation allowable range, image quality, and processing speed.

FIG. 11 shows the relationship between the image quality (resolution) and processing speed (calculation/imaging) depending on the size of the positional deviation allowable range. A circles indicate "excellent" or "fast", a cross mark indicates "poor" or "slow", and a triangle indicates "intermediate".

When the positional deviation allowable range is small, the image quality is high, but the processing speed is low. When the positional deviation allowable range is intermediate, both the image quality and the processing speed are intermediate too. When the positional deviation allowable range is large, misalignment or blurring occurs, resulting in poor image quality. However, the processing speed is high.

That is, as can be seen from the arrows shown on the right side in FIG. 11, priority is given to image quality is when the positional deviation allowable range is made smaller, and priority is given to processing speed when the positional deviation allowable range is made larger.

As described above, the image quality and the processing speed have a trade-off relationship, depending on the setting of the positional deviation allowable range. Accordingly, by setting the positional deviation allowable range, the user can select to prioritize image quality, or select to prioritize processing speed.

In other words, by selecting to prioritize image quality, or selecting to prioritize processing speed, the user can set the positional deviation allowable range (the threshold) in accordance with the selected priority.

<c. Dynamic Control on the Threshold, Depending on Vibration of the Imaging Device>

Figure 12:
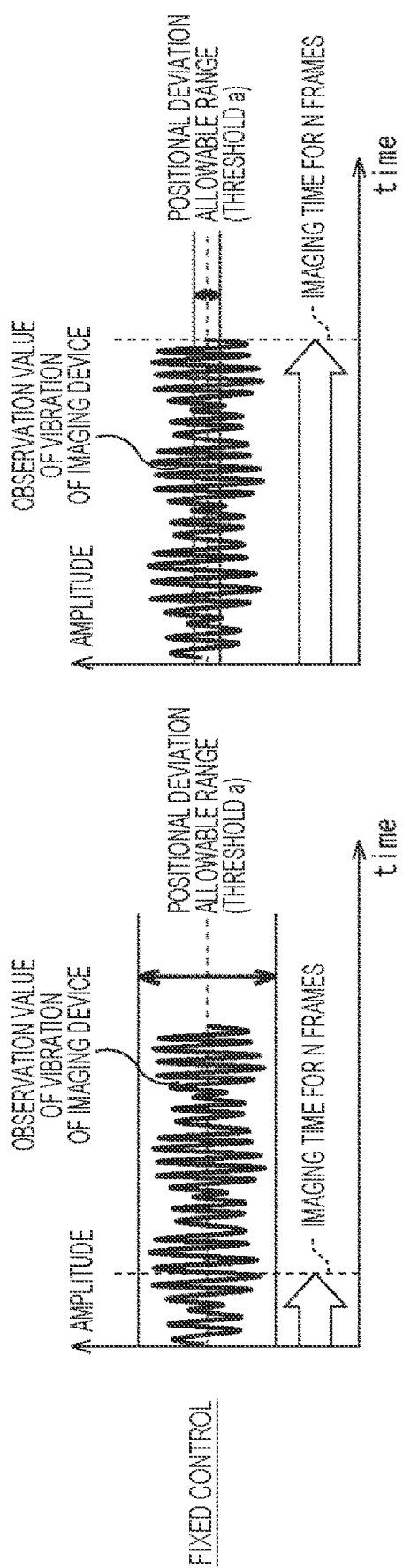
FIG. 12 is a diagram illustrating fixed control on a threshold.

FIG. 12 is a diagram illustrating cases where control is performed to fix the positional deviation allowable range (the threshold a for positional deviation determination).

In FIG. 12, graphs show observation values of vibration of the imaging device in time series. Note that an observation value of vibration of the imaging device is acquired from angle information supplied from the integration unit 37.

The left side in FIG. 12 shows the relationship between the amplitude of vibration of the imaging device (this amplitude will be hereinafter referred to as the vibration amplitude) and the imaging time (the processing speed) required until N valid frames are acquired when the threshold a is fixed at a large value. The right side in FIG. 12 shows the relationship between the vibration amplitude of the imaging device and the imaging time required until N valid frames are acquired when the threshold a is fixed at a small value.

When the threshold a is large, the time during which the vibration amplitude of the imaging device falls within the positional deviation allowable range is long. Accordingly, the probability that an imaged frame is a valid frame is high, and the time required for capturing N valid frames is shorter than that when the threshold a is small.

When the threshold a is small, on the other hand, the time during which the vibration amplitude of the imaging device falls within the positional deviation allowable range is short. Accordingly, the probability that an imaged frame is a valid frame is low, and the time required for capturing N valid frames is longer than that when the threshold a is.

That is, when the threshold a is fixed at a large value, the imaging time is shorter than that when the threshold a is fixed at a small value. However, misalignment or blurring of images due to vibration is larger.

When the threshold a is fixed at a small value, on the other hand, misalignment or blurring of images due to vibration is smaller than that when the threshold a is fixed at a large value. However, the imaging time is longer, and user-friendliness is degraded.

Figure 13:
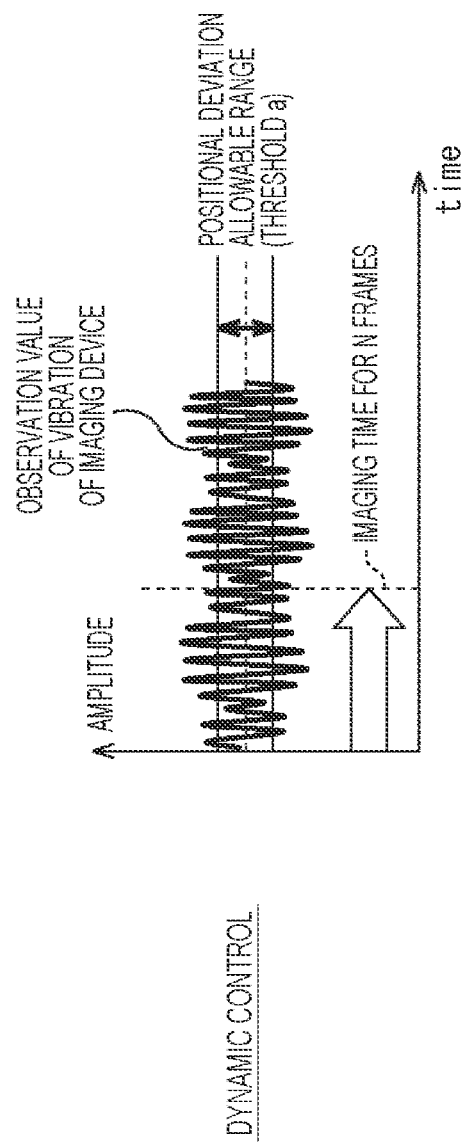
FIG. 13 is a diagram illustrating dynamic control on the threshold.

FIG. 13 is a diagram illustrating a case where the positional deviation allowable range (the threshold a for positional deviation determination) is dynamically controlled, on the basis of the results shown in FIG. 12.

FIG. 13 shows the imaging time until N valid frames are acquired when the threshold a is dynamically controlled in accordance with observation value of vibration of the imaging device.

When the threshold a is dynamically controlled, the threshold a is made larger when the vibration amplitude of the imaging device is large, and the threshold a is made smaller when the vibration amplitude of the imaging apparatus is small, for example.

Accordingly, when the threshold a is dynamically controlled, it is possible to avoid excessive degradation in image quality that would occur when the threshold a is fixed at a large value (the left side in FIG. 12). Also, when the threshold a is dynamically controlled, it is possible to avoid an excessive increase in the imaging time that would occur when the threshold a is fixed at a small value (the right side in FIG. 12).

As described above, it is possible to optimize image quality and the imaging time by dynamically controlling the threshold a depending on vibration of the imaging device.

Figure 14:
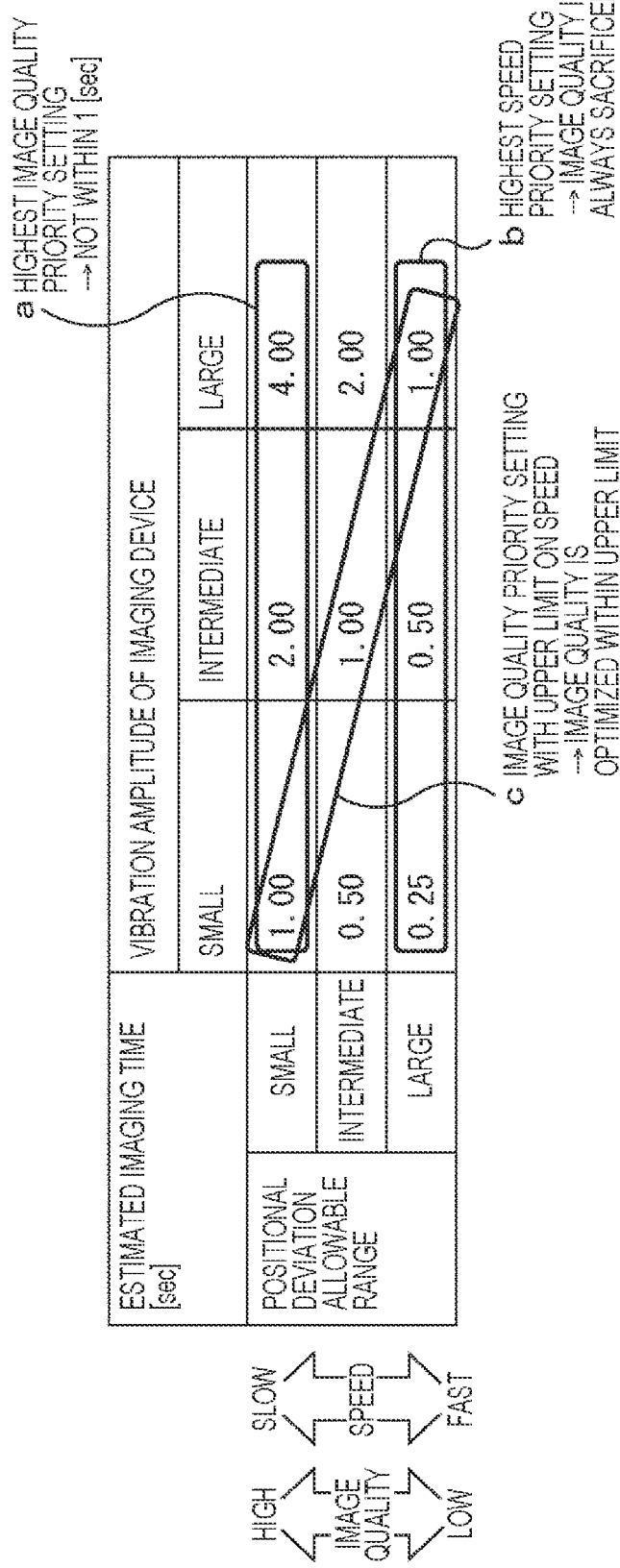
FIG. 14 is a diagram illustrating cases where an upper limit is set on an estimated imaging time.

FIG. 14 is a diagram illustrating cases where an upper limit is set on the imaging time.

In FIG. 14, the imaging times estimated on the basis of the magnitude of vibration amplitude of the imaging device and the size of the positional deviation allowable range are indicated by specific numerical values. Note that the numerical values are an example. FIG. 14 shows that the smaller the positional deviation allowable range, the higher the image quality and the lower the processing speed. Also, the larger the positional deviation allowable range, the lower the image quality and the higher the processing speed.

In a case where the vibration amplitude of the imaging device is small, when the positional deviation allowable range is set at a small value, the estimated imaging time is 1.00 sec. In a case where the vibration amplitude of the imaging device is small, when the positional deviation allowable range is set at an intermediate value, the estimated imaging time is 2.00 sec. In a case where the vibration amplitude of the imaging device is small, when the positional deviation allowable range is set at a large value, the estimated imaging time is 4.00 sec.

In a case where the vibration amplitude of the imaging device is intermediate, when the positional deviation allowable range is set at a small value, the estimated imaging time is 0.50 sec. In a case where the vibration amplitude of the imaging device is intermediate, when the positional deviation allowable range is set at an intermediate value, the estimated imaging time is 1.00 sec. In a case where the vibration amplitude of the imaging device is intermediate, when the positional deviation allowable range is set at a large value, the estimated imaging time is 2.00 sec.

In a case where the vibration amplitude of the imaging device is large, when the positional deviation allowable range is set at a small value, the estimated imaging time is 0.25 sec. In a case where the vibration amplitude of the imaging device is large, when the positional deviation allowable range is set at an intermediate value, the estimated imaging time is 0.50 sec. In a case where the vibration amplitude of the imaging device is large, when the positional deviation allowable range is set at a large value, the estimated imaging time is 1.00 sec.

In the case of the above configuration, when a highest image quality priority setting that minimizes the positional deviation allowable range is set, the estimated imaging time might not fall within 1.00 sec as shown in box a.

On the other hand, when a highest speed priority setting that maximizes the positional deviation allowable range, the estimated imaging time always falls within 1.00 sec as illustrated in box b, but the image quality is always sacrificed.

Therefore, an image quality priority setting with an upper limit on speed may be provided to set an upper limit on the imaging time (the processing speed) so that image quality is optimized within the upper limit of the imaging time.

For example, when the image quality priority setting with an upper limit on speed is set, the positional deviation allowable range is set at a small value when the vibration amplitude of the imaging device is small, the positional deviation allowable range is set at an intermediate value when the vibration amplitude of the imaging device is intermediate, and the positional deviation allowable range is set at a large value when the vibration amplitude of the imaging device is large, as shown in box c.

As described above, when the estimated imaging time is preferably within 1 sec from the viewpoint of convenience of the system and convenience for the user, the positional deviation allowable range is dynamically changed depending on the magnitude of vibration of the imaging device during imaging. Thus, the optimum image quality can be obtained within the upper limit of the imaging time.

Note that, in the example described above, the image sensor unit 1 is shifted by the amount equivalent to one pixel at a time (with a pixel precision of one pixel), but may be shifted with a pixel precision smaller than one pixel (with a pixel precision of 0.5 pixels, for example).

4. Other Aspects

Effects of the Present Technology

In the present technology, when imaging is performed while the pixel phase of an image sensor having a two-dimensional pixel array is shifted, a plurality of frames imaged in each pixel phase is added up for each pixel phase, an addition frame is generated for each pixel phase, and the addition frames of the respective pixel phases are combined.

As a result, even when the imaging device has minute vibration, sensor shift imaging can be performed, without any degradation in image quality.

Also, in the present technology, some frames are selected, and some frames are discarded, depending on the amount of positional deviation from the target pixel phase. That is, imaging is performed until a predetermined number of only valid frames whose positional deviation amounts are within a threshold are acquired.

As a result, any motion blur does not occur even when images are added up. Thus, both sensitivity and resolution can be obtained.

Also, in the present technology, a user can set a threshold for positional deviation determination. Thus, it is possible to cope with a user who puts a priority on image quality, as well as a user who puts a priority on speed.

Further, in the present technology, the threshold for positional deviation determination is dynamically controlled depending on vibration of the imaging device detected from sensors.

Thus, the image quality and the processing speed can be optimized in accordance with dynamic changes in vibration of the imaging device.

(Example Configuration of a Computer)

The series of processes described above can be performed by hardware, and can also be performed by software. When the series of processes are performed by software, the program that forms the software may be installed in a computer incorporated into special-purpose hardware, or may be installed from a program recording medium into a general-purpose personal computer or the like.

FIG. 15 is a block diagram showing an example configuration of the hardware of a computer that performs the above series of processes according to a program.

A CPU 301, a read only memory (ROM) 302, and a RAM 303 are mutually connected by a bus 304.

An input/output interface 305 is further connected to the bus 304. An input unit 306 formed with a keyboard, a mouse, and the like, and an output unit 307 formed with a display, a speaker, and the like are connected to the input/output interface 305. Further, a storage unit 308 formed with a hard disk, a nonvolatile memory, or the like, a communication unit 309 formed with a network interface or the like, and a drive 310 that drives a removable medium 311 are connected to the input/output interface 305.

In the computer having the above described configuration, the CPU 301 loads a program stored in the storage unit 308 into the RAM 303 via the input/output interface 305 and the bus 304, for example, and executes the program, so that the above described series of processes are performed.

The program to be executed by the CPU 301 is recorded in the removable medium 311 and is thus provided, for example, or is provided via a wired or wireless transmission medium, such as a local area network, the Internet, or digital broadcasting. The program is then installed into the storage unit 308.

Note that the program to be executed by the computer may be a program for performing processes in chronological order in accordance with the sequence described in this specification, or may be a program for performing processes in parallel or performing a process when necessary, such as when there is a call.

It should be noted that, in this specification, a system means an assembly of components (devices, modules (parts), and the like), and not all the components need to be provided in the same housing. In view of this, a plurality of devices that are housed in different housings and are connected to one another via a network forms a system, and one device having a plurality of modules housed in one housing is also a system.

Further, the advantageous effects described in this specification are merely examples, and the advantageous effects of the present technology are not limited to them or may include other effects.

Embodiments of the present technology are not limited to the embodiments described above, and various modifications may be made to them without departing from the scope of the present technology.

For example, the present technology can be embodied in a cloud computing configuration in which one function is shared among devices via a network, and processing is performed by the devices cooperating with one another.

Further, the respective steps described with reference to the flowcharts described above can be carried out by one device, or can be shared among a plurality of devices.

Furthermore, when a plurality of processes is included in one step, the plurality of processes included in the one step can be performed by one device, or can be shared among a plurality of devices.

Example Combinations of Configurations

The present technology can also be embodied in the configurations described below.

(1)

An image processing device including:

an addition unit that adds up, for each pixel phase, a plurality of frames imaged in each pixel phase, and generates an addition frame for each pixel phase, when performing imaging while shifting the pixel phase of an image sensor having a two-dimensional pixel array; and a combining unit that combines the addition frames of the respective pixel phases.

(2)

The image processing device according to (1), in which the addition unit adds up only valid frames imaged in a state in which a positional deviation amount of the image sensor with respect to each of the pixel phases is within a threshold.

(3)

The image processing device according to (2), further including a threshold setting unit that sets the threshold, on the basis of a user's operation.

(4)

The image processing device according to (3), in which the threshold setting unit sets the threshold, in accordance with selection of an image quality priority for prioritizing image quality, or selection of a speed priority for prioritizing a speed at which the valid frames are acquired.

(5)

The image processing device according to (4), in which, when the image quality priority is selected between the image quality priority and the speed priority, the threshold setting unit sets the threshold at a smaller value than the threshold to be set when the speed priority is selected.

(6)

The image processing device according to (3), in which, when an upper limit value of the speed at which the valid frames are acquired is set, the threshold setting unit sets the threshold at a maximum value within a range in which the speed at which the valid frames are acquired reaches the upper limit value.

(7)

The image processing device according to (1) or (2), further including:

a sensor that detects vibration of the image sensor; and a threshold setting unit that sets the threshold, in accordance with the vibration of the image sensor detected by the sensor.

(8)

The image processing device according to any one of (1) to (7), in which the addition unit adds up a predetermined number of frames for each pixel phase.

(9)

The image processing device according to any one of (1) to (8), further including:

the image sensor that images frames in each of the pixel phases; and a shift control unit that shifts the pixel phase.

(10)

The image processing device according to (9), in which the shift control unit shifts the pixel phase by shifting the image sensor.

(11)

The image processing device according to (9), in which the shift control unit shifts the pixel phase by shifting a lens.

(12)

The image processing device according to (9), in which the image sensor images frames at a high shutter speed that is higher than a normal shutter speed at which an appropriate exposure amount is obtained by one-time exposure.

(13)

The image processing device according to any one of (1) to (12), further including a motion compensation unit that compensates for motion of the frames imaged in each pixel phase as necessary.

(14)

The image processing device according to any one of (1) to (13), in which the image processing device includes an imaging device.

(15)

An image processing method implemented by an image processing device, the image processing method including:

adding up, for each pixel phase, a plurality of frames imaged in each pixel phase, and generating an addition frame for each pixel phase, when imaging is performed while the pixel phase of an image sensor having a two-dimensional pixel array is shifted; and combining the addition frames of the respective pixel phases.

(16)

A program for causing a computer to function as:

an addition unit that adds up, for each pixel phase, a plurality of frames imaged in each pixel phase, and generates an addition frame for each pixel phase, when performing imaging while shifting the pixel phase of an image sensor having a two-dimensional pixel array; and a combining unit that combines the addition frames of the respective pixel phases.

REFERENCE SIGNS LIST

1 Image sensor unit
2 Pixel
11 Sensor shift imaging system
21 High-speed imaging calculation unit
22 Sensor shift combining unit
23 Operation input unit
31 High-speed imaging unit
32 Sensor shift unit
33 Motion compensation unit
34 Frame addition unit
35 Gyroscope sensor
36 IMU measurement unit
37 Integration unit
38 Positional deviation determination unit

The invention claimed is:

1. A sensor-shift imaging device comprising:
circuitry configured to:
perform sensor-shift imaging of pixel phases of an image sensor having a two-dimensional pixel array;
acquire a plurality of frames imaged in each pixel phase;
add up, for each pixel phase, the plurality of frames to generate addition frames for the respective pixel phases; and
combine the addition frames of the respective pixel phases.

2. The sensor-shift imaging device according to claim 1, wherein
the circuitry adds up only valid frames imaged in a state in which a positional deviation amount of the image sensor with respect to each of the pixel phases is within a threshold.

3. The sensor-shift imaging device according to claim 2, wherein the circuitry is further configured to:
set the threshold, on a basis of a user's operation.

4. The sensor-shift imaging device according to claim 3, wherein
the circuitry sets the threshold, in accordance with selection of an image quality priority for prioritizing image quality, or selection of a speed priority for prioritizing a speed at which the valid frames are acquired.

5. The sensor-shift imaging device according to claim 4, wherein,
when the image quality priority is selected between the image quality priority and the speed priority, the circuitry sets the threshold at a smaller value than the threshold to be set when the speed priority is selected.

6. The sensor-shift imaging device according to claim 3, wherein,
when an upper limit value of the speed at which the valid frames are acquired is set, the circuitry sets the threshold at a maximum value within a range in which the speed at which the valid frames are acquired reaches the upper limit value.

7. The sensor-shift imaging device according to claim 2, further comprising:
a sensor that detects vibration of the image sensor, wherein
the circuitry is further configured to set the threshold, in accordance with the vibration of the image sensor detected by the sensor.

8. The sensor-shift imaging device according to claim 1, wherein
the circuitry adds up a predetermined number of frames for each pixel phase.

9. The sensor-shift imaging device according to claim 1, further comprising:
the image sensor that images frames in each of the pixel phases, wherein
the circuitry is further configured to shift the pixel phase.

10. The sensor-shift imaging device according to claim 9, wherein
the circuitry shifts the pixel phase by shifting the image sensor.

11. The sensor-shift imaging device according to claim 9, wherein
the circuitry shifts the pixel phase by shifting a lens.

12. The sensor-shift imaging device according to claim 9, wherein
the image sensor images frames at a high shutter speed that is higher than a normal shutter speed at which an appropriate exposure amount is obtained by one-time exposure.

13. The sensor-shift imaging device according to claim 1, wherein the circuitry is further configured to:
compensate for motion of the frames imaged in each pixel phase as necessary.

14. An image processing method implemented by a sensor-shift imaging device, the image processing method comprising:
performing sensor-shift imaging of pixel phases of an image sensor having a two-dimensional pixel array;
acquiring a plurality of frames imaged in each pixel phase;
adding up, for each pixel phase, the plurality of frames to generate addition frames for the respective pixel phases; and
combining the addition frames of the respective pixel phases.

15. A non-transitory computer-readable medium having embodied thereon a program, which when executed by a computer causes the computer to execute an image processing method, the method comprising:
performing sensor-shift imaging of pixel phases of an image sensor having a two-dimensional pixel array;
acquiring a plurality of frames imaged in each pixel phase;
adding up, for each pixel phase, the plurality of frames to generate addition frames for the respective pixel phases; and
combining the addition frames of the respective pixel phases.

* * * * *